(12) United States Patent
Whitelock (10) Patent No.: US 7,707,025 B2
(45) Date of Patent: Apr. 27, 2010

(54) METHOD AND APPARATUS FOR TRANSLATION BASED ON A REPOSITORY OF EXISTING TRANSLATIONS

(75) Inventor: Peter J. Whitelock, Botley (GB)

(73) Assignee: Sharp Kabushiki Kaisha, Osaka (JP)

( * ) Notice: Subject to any disclaimer, the term of this patent is extended or adjusted under 35 U.S.C. 154(b) by 896 days.

(21) Appl. No.: 11/159,322

(22) Filed: Jun. 23, 2005

(65) Prior Publication Data

US 2006/0004560 A1 Jan. 5, 2006

(30) Foreign Application Priority Data

Jun. 24, 2004 (GB) ................... 0414180.0

(51) Int. Cl.
*G06F 17/28* (2006.01)
(52) U.S. Cl. .................... 704/5; 704/2; 704/4
(58) Field of Classification Search ............ 704/2, 704/4, 5, 7
See application file for complete search history.

(56) References Cited

U.S. PATENT DOCUMENTS

| | | | |
|---|---|---|---|
| 5,659,765 A | 8/1997 | Nii et al. | |
| 5,724,593 A | 3/1998 | Hargrave, III et al. | |
| 5,907,821 A | 5/1999 | Kaji et al. | |
| 6,151,570 A * | 11/2000 | Fuji | 704/3 |
| 6,161,083 A * | 12/2000 | Franz et al. | 704/4 |
| 6,345,244 B1 | 2/2002 | Clark | |
| 6,473,729 B1 * | 10/2002 | Gastaldo et al. | 704/4 |
| 6,535,842 B1 | 3/2003 | Roche et al. | |
| 6,598,015 B1 | 7/2003 | Peterson et al. | |
| 2002/0138250 A1 * | 9/2002 | Okura et al. | 704/2 |
| 2003/0125928 A1 | 7/2003 | Lee et al. | |
| 2004/0002848 A1 * | 1/2004 | Zhou et al. | 704/2 |

(Continued)

FOREIGN PATENT DOCUMENTS

| | | |
|---|---|---|
| GR | 1002453 B | 10/1996 |
| JP | 2002-278963 A | 9/2002 |
| WO | WO-9957651 A1 | 11/1999 |

OTHER PUBLICATIONS

Somers, "Review article: Example-based machine translation", Machine translation, vol. 14, pp. 113-157, 1999.*

(Continued)

*Primary Examiner*—Richemond Dorvil
*Assistant Examiner*—Jialong He
(74) *Attorney, Agent, or Firm*—Birch, Stewart, Kolasch & Birch, LLP (57) ABSTRACT

A method of translating an input sentence in a source language to an output sentence in a target language uses a store comprising a plurality of example sentences. A base example sentence is chosen from the store based on a comparison of the input sentence with a plurality of example sentences, and its paired translation is used as a translation basis. A portion of the input sentence differing from a corresponding portion of the base example sentence is identified. A portion of the translation basis aligned with the base example unmatched is located. The input unmatched portion is used to select a set of subsidiary example sentences from the store. A choice of possible translations corresponding to the input unmatched portion is determined from the set of subsidiary example sentences. A translation is selected from the choice based on a predetermined selection algorithm.

33 Claims, 7 Drawing Sheets

U.S. PATENT DOCUMENTS

2004/0002849 A1 1/2004 Zhou
2004/0098247 A1* 5/2004 Moore .......................... 704/4

OTHER PUBLICATIONS

Maruyama, Hiroshi et al. "Tree Cover Search Algorithm for Example-Based Translation" Proceedings of the 4th TMI, Montreal, 1992, p. 173-184, IBM Research, Tokyo Research Laboratory.

Brown, Ralf D "Example-Based Machine Translation in the Pangloss System" Proceeding of the 16th Coling, Copenhagen, 1996 p. 169-174, Center for Machine Translation, Carnegie Mellon University.

Sato et al., "Toward Memory-based Translation" Proceedings of the 13th Coling, Helsinki, 1990, pp. 247-252. Dept. Of Electrical Engineering, Kyoto University.

* cited by examiner

METHOD AND APPARATUS FOR TRANSLATION BASED ON A REPOSITORY OF EXISTING TRANSLATIONS

BACKGROUND OF THE INVENTION

1. Field of the Invention

The present invention relates to a method and apparatus for translating an input sequence of data items in a first format to an output sequence of data items in a second format. In particular, but not exclusively, the present invention relates to the translation of a sentence in a source language to a sentence in a target language.

2. Description of the Related Art

Various techniques are known within the field of Machine Translation, or Machine Aided Translation, that use a repository of existing translated material to assist or automate the production of translations. A Translation Memory (TM) system has a repository of source language sentences each paired with its associated target language sentence, and operates by locating in the repository a sentence that is very close in structure and content to an input sentence, with the associated target language sentence being presented to a translator for manual post-editing. An Example-Based Machine Translation (EBMT) system attempts fully automatic translation and operates by decomposing an input sentence into fragments, finding a translation for each fragment in the repository and then combining these fragmentary translations into a target sentence.

Translation memory systems are highly accurate but tend to have limited coverage. Differences between the input sentence and the retrieved sentences are typically limited to slight variations in word order, morphological form or spelling. Often no changes are made to the target side of the example pair; it is simply presented to the translator as the best matching sentence.

In more sophisticated TM systems, certain elements in the target example may be replaced by their 'translations'. However, such elements are limited to "placeables", as discussed in WO 99/57651. In this context, a placeable is an element such as a name or a number which does not require translation but can be copied or whose format can be simply adjusted to meet target language or locality standards.

EBMT systems have much wider coverage, but lower accuracy. This is because, like other techniques for fully-automatic translation, they depend on the incorporation in the system of large quantities of linguistic or statistical knowledge, and this is difficult to collect and encode in an exhaustive manner. Such knowledge is necessary in an EBMT system to enable the decomposition of an input sentence into coherent fragments and the subsequent combination of the translated fragments into a sentence which is well-formed according to the grammar of the target language.

The Machine Aided Translation systems mentioned above make use of well known techniques for indexing and matching of source language inputs against the source language side of examples in the repository, and alignment of the words between source and target language sides of examples.

Techniques for matching are disclosed in GR 1002453 "Intelligent device for retrieving multilingual texts", which describes the use of edit distance, and U.S. Pat. No. 6,161,083 "Example-based translation method and system which calculates word similarity degrees, a priori probability, and transformation probability to determine the best example for translation". The references: "Example-Based Machine Translation in the Pangloss System", Brown, R. D., Proceedings of the 16th Coling, Copenhagen, 1996; U.S. 2003/0125928 "Method for retrieving similar sentence in translation aid system"; and U.S. 2004/0002849 "System and method for automatic retrieval of example sentences based upon weighted editing distance" describe the use of two-stage schemes, in which a first stage based on standard information retrieval techniques determines a small set of examples which are then subject, in a second stage, to a more expensive similarity computation based on edit-distance or similar. Other indexing techniques are disclosed in: U.S. Pat. No. 5,724,593 "Machine assisted translation tools", which describes the use of character n-grams for indexing; and U.S. Pat. No. 6,473,729 "Word phrase translation using a phrase index".

When one or more matching examples have been found, it is then necessary to determine their possible translations. If a complete example is matched, its translation is just its paired target language string. But if matching is only partial then it is necessary to determine which portions of the source language string are aligned with which portions of the target language string, with each matched portion in one language completely matching a corresponding matched portion in the other language, and each unmatched portion in one language not matching any portion in the other language at all.

Techniques for alignment of words and/or phrases in bilingual sentence pairs are widely described in the literature. U.S. Pat. No. 5,659,765 "Machine Translation System" describes an interface to allow a user to specify such alignments. U.S. Pat. No. 5,907,821 "Method of computer-based automatic extraction of translation pairs of words from a bilingual text" describes a statistical method based on co-occurrence frequencies. U.S. Pat. No. 6,345,244 "System, method, and product for dynamically aligning translations in a translation-memory system" describes a method based on features shared between words in translations. U.S. Pat. No. 6,598,015 "Context based computer-assisted language translation" describes the use of common format information between the pair. U.S. Pat. No. 6,535,842 "Automatic bilingual translation memory system" describes a hierarchical combination of alignments to produce alignments for phrases of all sizes. Alignment may take place during the processing of a given input sentence, or off-line, prior to the processing, as is usually the case. Alignment may also be a two-stage process with an off-line word alignment and on-line alignment of larger phrases as described in US 2004/0002848 "Example based machine translation system".

EBMT systems are disclosed in: Sato and Nagao, "Towards Memory-Based Translation" in Proceedings of 13th Coling, Helsinki (1990); Maruyama and Watanabe, "Tree Cover Search Algorithm for EBMT" in Proceedings of 4th TMI, Montreal (1992); U.S. Pat. No. 6,161,083 "Example-based translation method and system which calculates word similarity degrees, a priori probability, and transformation probability to determine the best example for translation"; Brown, R. D., "Example-Based Machine Translation in the Pangloss System" in Proceedings of the 16th Coling, Copenhagen, (1996); and US 2004/0002848, amongst others. These systems all use a matching phase and an alignment phase and in distinction to TM systems may determine several examples each of which matches only a fragment of the input. They disclose various approaches to the problems of breaking a sentence into fragments, choosing a best translation of each fragment, and combining the translations of the fragments into a coherent target language text.

There are two main approaches to the determining and combining of fragments. Generally speaking, in the prior art that is concerned with EBMT between structurally dissimilar languages (i.e. with very different word orders) such as English and Japanese (see Sato and Nagao referenced above; and Maruyama and Watanabe, U.S. Pat. No. 6,161,083) fragmentation and combination is based on a full syntax analysis and tree-structured alignments between source and target sides of an example. In EBMT between languages with similar word order such as English and French (see the R. D. Brown paper referenced above) or English and Chinese (see US 2004/0002848), the translations of fragments may be combined according to the order in the source language.

As regards choosing the best translation of each fragment, this is normally assumed to be the alignment in the example that best matches that fragment. In Sato and Nagao (referenced above) and US 2004/0002848, the best example is determined on the basis of similarity between the input and the entire example containing the fragment. The paper by R. D. Brown (reference above) discloses a method in which "the translation probability is simply the proportion of times each distinct alternative translation was encountered out of all successful alignments for a particular source-language phrase".

It is desirable to improve the coverage of a Translation Memory system by extending the range of types of element that may differ between an input sentence and a stored example. It is desirable to allow an input sentence and a stored sentence to differ by any elements which may be substituted one for the other without changing the well-formedness of the sentences involved. If it is necessary to translate substitutable elements then it is desirable to provide a method of choosing between the alternative translations that such elements may have in different contexts. It is also desirable to provide a method in which the contextually correct translation of arbitrary substitutable elements may be determined without the need for extensive linguistic knowledge or deep linguistic analysis.

SUMMARY OF THE INVENTION

An embodiment of a first aspect of the present invention provides a method of translating an input sequence of data items in a first format to an output sequence of data items in a second format using a store comprising a plurality of example sequences in the first format each paired with its translation in the second format. In step (a) a base example sequence is chosen from the store based on a comparison of the input sequence with each of a plurality of example sequences from the store, and its paired translation is used as a translation basis. In step (b) a portion of the input sequence is identified differing from a corresponding portion of the base example sequence, these portions being designated input and base example unmatched portions respectively. In step (c) a portion of the translation basis is located corresponding to the base example unmatched portion. In step (d) the input unmatched portion is used to select a set of subsidiary example sequences from the store. In step (e) it is determined from the set of subsidiary example sequences a choice of possible translations corresponding to the input unmatched portion. In step (f) a translation is selected from the choice based on a predetermined selection algorithm and the selected translation is used to replace the portion located in step (c). The result of step (f) is used as a basis for the output sequence of data items.

Steps (b) to (f) may be repeated for a plurality of input unmatched portions identified in the input sequence. Steps (b) to (f) may be repeated for every unmatched portion identified in the input sequence. The base example sequence chosen in step (a) may be the example sequence from the store which most closely matches the input sequence according to a predetermined measure of closeness.

A base example unmatched portion identified in step (b), and its corresponding translation basis portion located in step (c), may be an empty sequence positioned between two adjacent data items, such that the replacement in step (f) is effectively an insertion at a position.

In step (f) a morphological variant of the selected translation may be used to replace the portion located in step (c) depending on context.

Further processing may be performed on the sequence resulting from step (f) before use as the output sequence of data items.

The data items may be words. The first and second formats may be first and second languages respectively. The input sequence of data items may form a grammatically complete phrase. The input sequence of data items may form a sentence.

In step (c) the portion may be located using an alignment between parts of the base example sequence and respective parts of its paired translation. The alignment may be predetermined.

Step (d) may comprise selecting an example sequence for inclusion in the set if at least one data item in the example sequence matches or corresponds to at least one data item in the input unmatched portion.

Step (e) may comprise identifying, for a subsidiary example in the set, a portion of the subsidiary example corresponding to the input unmatched portion, and using a corresponding portion of the translation paired to the subsidiary example to form one of the possible translations in the choice.

The predetermined selection algorithm may comprise, for each of at least one translation in the choice, allocating to the translation a preference value determined in dependence upon at least one subsidiary example from which the translation is derived.

A preference value may be determined in dependence upon a comparison between the input sequence and each of the at least one subsidiary example.

A preference value may be determined by allocating a weighting to the or each such comparison, and combining the allocated weighting(s) in a predetermined manner.

A weighting may be allocated in dependence upon the number of data items or variants thereof common to the input sequence and the subsidiary example in the comparison.

A weighting may be allocated in dependence upon one or more of the following properties of a data item common to the input sequence and the subsidiary example: the position in sequence of the common data item; the frequency of the common data item in a predetermined corpus; the cooccurrence frequency of the common data item with the input unmatched portion; and the deviation of the coocurrence frequency from that predicted by the frequency of the common data item.

A weighting may be allocated in dependence upon the position in sequence of the common data item relative to the unmatched portion.

The allocated weighting(s) may be combined by summation.

In one example, the data item(s) in the input unmatched portion is/are not included in the comparison.

A preference value may be determined in dependence upon a comparison between the translation basis and the translation paired to each of the at least one subsidiary example.

The predetermined selection algorithm may further comprise selecting a translation from the choice in dependence upon allocated preference value(s).

A preference value may be allocated to the or each translation in the choice.

The preference value may be determined in dependence upon the or each subsidiary example from which the translation is derived.

The predetermined selection algorithm may allow manual intervention to influence the translation selected.

The method may comprise, where a suitable translation cannot be selected in step (f), subdividing the input unmatched portion into a plurality of input unmatched portions and identifying corresponding respective base example unmatched portions, and performing steps (c) to (f) for each unmatched portion.

The method may comprise, where a suitable base example cannot be found in step (a), subdividing the input sequence into a plurality of input sub-sequences, performing steps (a) to (f) for each such sub-sequence, and combining the results from the steps (f) to produce the output sequence in step (g).

The store may comprise separate stores for use respectively in steps (a) and (d). In the apparatus according to the second aspect of the present invention described below, the first of these stores may or may not form part of the apparatus.

An embodiment of a second aspect of the present invention provides an apparatus for translating an input sequence of data items in a first format to an output sequence of data items in a second format using a store comprising a plurality of example sequences in the first format each paired with its translation in the second format. A unit chooses a base example sequence from the store based on a comparison of the input sequence with each of a plurality of example sequences from the store, and uses its paired translation as a translation basis. A unit identifies a portion of the input sequence differing from a corresponding portion of the base example sequence, these portions being designated input and base example unmatched portions respectively. A unit locates a portion of the translation basis corresponding to the base example unmatched portion. A unit uses the input unmatched portion to select a set of subsidiary example sequences from the store. A unit determines from the set of subsidiary example sequences a choice of possible translations corresponding to the input unmatched portion. A unit selects a translation from the choice based on a predetermined selection algorithm and uses the selected translation to replace the portion located by the locating unit. A unit uses the result of the selecting unit as a basis for the output sequence of data items.

An embodiment of a third aspect of the present invention provides a Translation Memory system comprising apparatus embodying the second aspect of the present invention.

An embodiment of a fourth aspect of the present invention provides a computer program which, when run on a computer, causes the computer to carry out a method embodying the first aspect of the present invention.

An embodiment of a fifth aspect of the present invention provides a computer program which, when loaded into a computer, causes the computer to become an apparatus or a system embodying the second or third aspects of the present invention respectively.

The computer program may be carried on a carrier medium. The carrier medium may be a transmission medium. The carrier medium may be a storage medium.

DETAILED DESCRIPTION OF THE PREFERRED EMBODIMENTS

Figure 1:
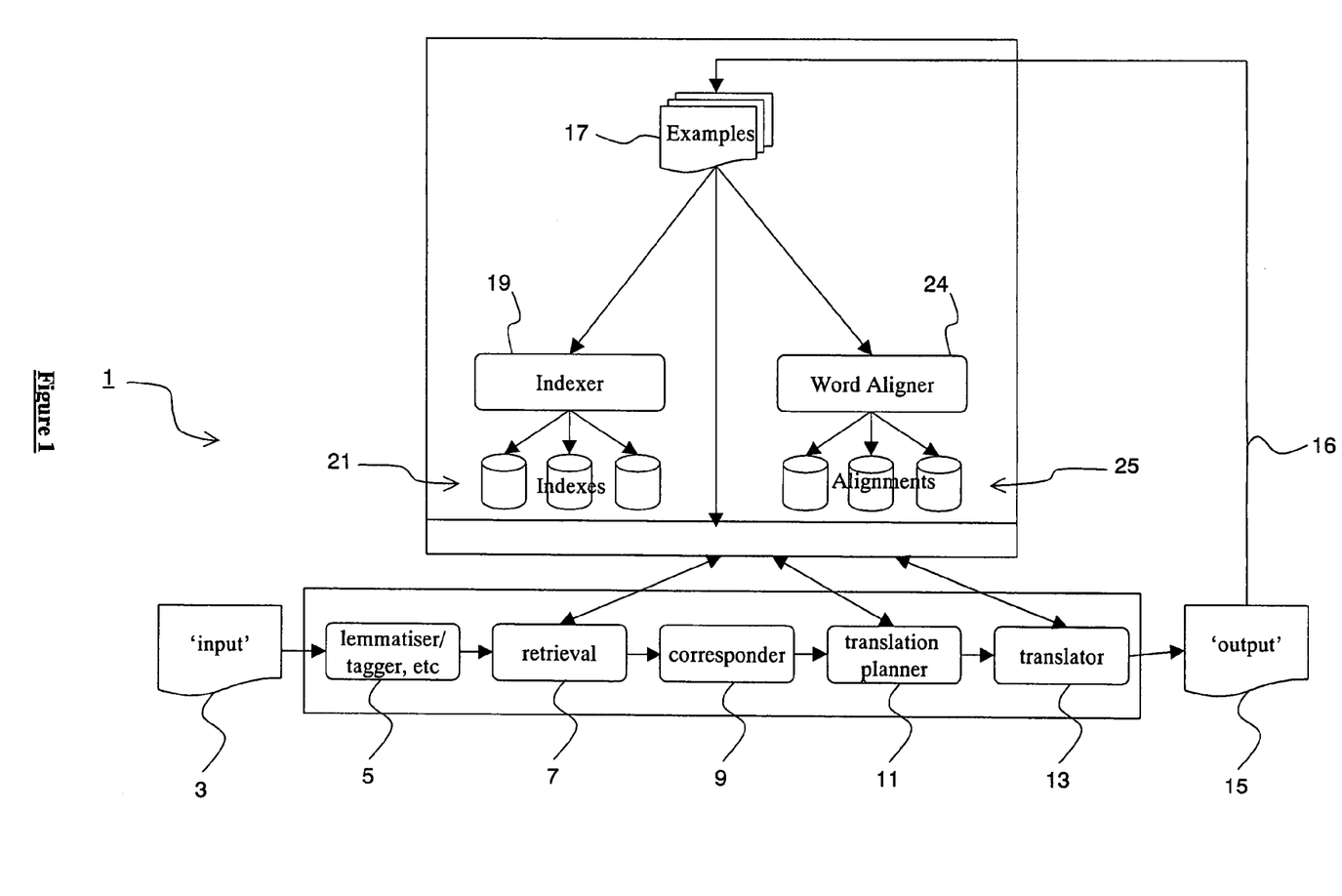
FIG. 1 is a schematic diagram illustrating a translation apparatus embodying the present invention.
Figure 2:
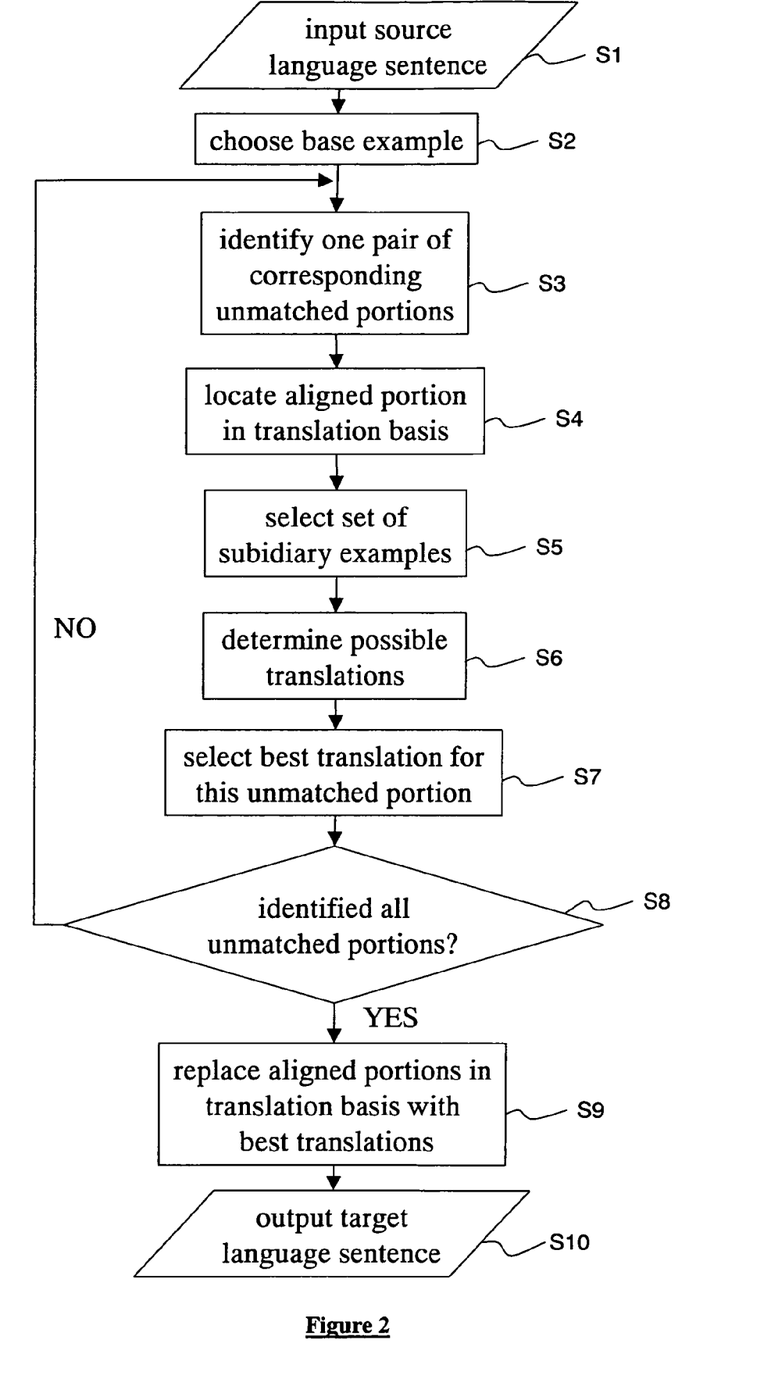
FIG. 2 is a flowchart showing the steps performed by the translation apparatus of FIG. 1.

A method and apparatus embodying the present invention for translating an input sentence in a source language to an output sentence in a target language will now be described. FIG. 1 is a schematic diagram illustrating the module structure of a translation apparatus 1 embodying the present invention, and FIG. 2 is a flowchart showing the steps performed by the translation apparatus 1 in this embodiment.

The translation apparatus 1 comprises an input portion 3 for receiving the input sentence in the source language and an output portion 15 for outputting the translated output sentence in the target language. As will be explained below, translation is performed with reference to a store 17 comprising a plurality of example sentences in the source language each paired with its translation in the target language. The translation apparatus 1 also comprises a lemmatiser/tagger portion 5, a retrieval portion 7, a corresponder portion 9, a translation planner portion 11 and a translator portion 13 arranged in sequence between the input portion 3 and the output portion 15. The translation apparatus 1 also comprises an indexer portion 19 maintaining a set of indexes 21 and a word aligner portion 24 maintaining a set of alignments 25, as explained further below.

In step S1, a sentence in the source language is introduced at the input portion 3 and passed to the lemmatiser/tagger portion 5 which analyses the sentence and performs various pre-processing operations based on that analysis. If the source language does not separate words by spaces, then the input sentence undergoes segmentation. The input sentence also undergoes morphological analysis at this stage. Morphological analysis includes tagging, in which each segment is assigned one or more likely parts of speech relating to that segment (such as Noun, Past Participle, Subordinating Conjunction) and determining the citation or dictionary form of each word. At the end of this phase, the input sentence has been transformed into a list of query terms which may comprise words, citation forms or lemmas (the latter being a combination of a dictionary form and a part-of-speech), or some combination thereof.

In step S2, a base example is chosen from the store 17 based on a comparison of the input sentence with each of a plurality of example sentences from the store 17, and its paired translation is used as a translation basis for later steps in the process to be described below. The method by which the base example is determined is not important to the overall operation of an embodiment of the present invention, but in the present embodiment a two-stage scheme is employed, with the two stages of step S2 being performed by the retrieval portion 7 and the corresponder portion 9 respectively.

Unlike the prior art two-stage schemes described above, the first stage in the present embodiment is implemented by means of a boolean retrieval scheme. As distinct from the disclosure in US 2004/0002848, no use is made of notions such as the Term Frequency (TF), which is the frequency of a term in a given document, and the Inverse Document Frequency (IDF), which is a measure of the inverse of the number of documents in which a term occurs. The TF is usually unnecessary since the units of retrieval are usually so small that the TF rarely differs from unity except for stop words. Even when the TF of a given input term does exceed unity in a particular example, this is typically an unwanted source of complexity rather than a better indication of similarity. The IDF is also usually unimportant in determining base example since sentences which share high frequency items (in the same configuration) are as likely to be a good basis for translation as those which share the low frequency items emphasised by IDF.

In the first stage of choosing the base example in step S2, the retrieval portion 7 consults the indexes 21 which specify for each query term in the input sentence a list of examples in the store 17 containing that query term. This list is called a postings list. The indexes 21 are created and maintained by the indexer portion 19. Some terms, called stop words, occur in too many examples to be useful as index terms and may be ignored at this stage. The union of all examples which appear on any postings list is determined and for each of these examples it is determined which postings lists it appears on, that is, which of the query terms it contains. A data structure is constructed that maps from subsets of the input query terms to the examples containing that subset. This data structure is referred to as a "powerset" data structure.

Figure 3:
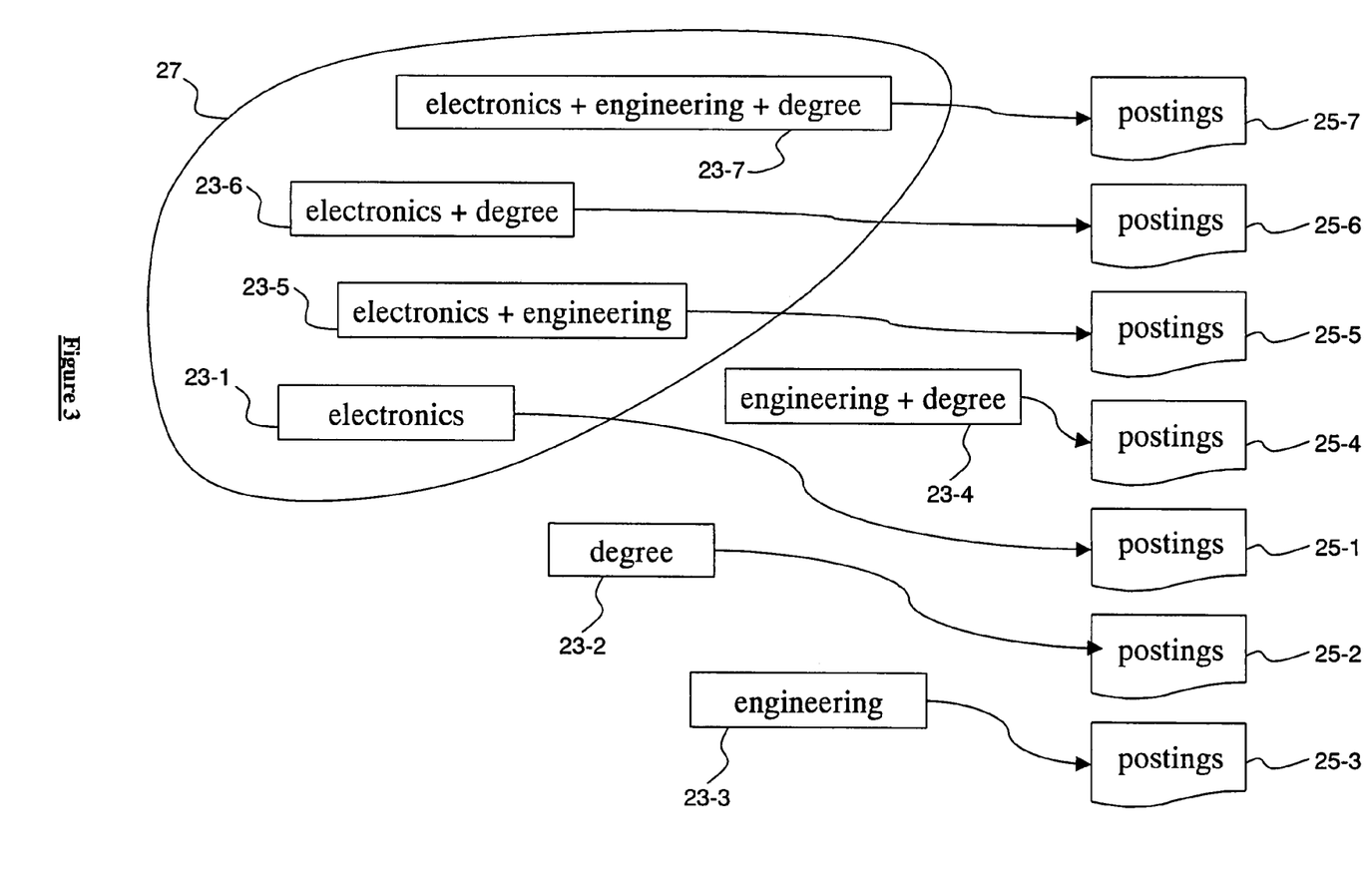
FIG. 3 is a schematic illustration of a powerset data structure used in an embodiment of the present invention.

FIG. 3 illustrates a powerset data structure constructed for the input phrase "electronics engineering degree". The powerset data structure comprises a number of powerset elements 23-1 to 23-7 linked to respective postings lists 25-1 to 25-7. A powerset element specifies a subset of one or more words appearing in the input phrase, and its associated postings list contains a list of all the examples in the store 17 that contain all the words specified in the powerset element, in any order and not necessarily adjacent.

For example, powerset element 23-1 in FIG. 3 contains the single word "electronics" and its associated postings list 25-1 contains a list of all the examples in the store 17 containing the word "electronics". Powerset element 23-5 contains the words "electronics" and "engineering" and its associated postings list 25-5 contains a list of all the examples in the store 17 containing the word "electronics" and the word "engineering" (whether or not these two words appear adjacently in that order). Powerset element 23-7 contains the words "electronics", "engineering" and "degree", and its associated postings list 25-7 contains a list of all the examples in the store 17 containing each of the words "electronics", "engineering" and "degree" (whether or not these three words appear adjacently in that order).

Also illustrated in FIG. 3 is a subset 27 of powerset elements containing the word "electronics". As explained in more detail below, this subset would be examined when attempting to determine a translation for the word "electronics". In general, the other words (if any) in the powerset element act as context terms, and the larger the powerset element the greater degree of influence on the final translation.

Finally in the first stage of step S2, a number of examples are then selected for a more detailed computation of similarity to the input sentence, making use of the powerset data structure for the input sentence. Starting with the largest set of query terms (i.e. the largest powerset element), the examples in the associated postings list are selected for the more detailed analysis. Increasingly smaller subsets of query terms (i.e. increasingly smaller powerset elements) are considered until the number of examples selected for more detailed analysis exceeds some threshold, or the cardinality of the subset falls below some threshold. At this stage, subsets are ordered only by their cardinality and not by other values such as IDF.

Each of the selected examples is then passed to the second stage of step S2, performed by the corresponder portion 9. For each example received, the corresponder portion 9 computes the longest common subsequence (LCS) between the input and the example. The LCS of two strings of symbols (here terms, including stop words) is the longest sequence of symbols which occur in the same order in the two strings, although not necessarily adjacently (see, for example, Gusfeld, "Algorithms on Strings, Trees and Sequences", CUP 1997). The LCS defines a sequence of alternating "matched" and "unmatched" stretches in the input and example sentences, with each matched stretch in one being paired with a matched stretch in the other, and likewise each unmatched stretch in one being paired with an unmatched stretch in the other.

Therefore, in contrast to the prior art, the second stage of determining similarity is based not upon edit distance but on the computation of the LCS. One advantage of LCS over edit distance and other metrics of string similarity is that an LCS defines a correspondence between input and example strings, a correspondence being a pairing of stretches in the two strings so that both strings are divided into alternate matched/unmatched stretches along their length. A correspondence is often called an alignment in the literature but the different term is used here to distinguish it from alignment between sentences in different languages. Empty strings are allowed to appear as either side.

Figure 4:
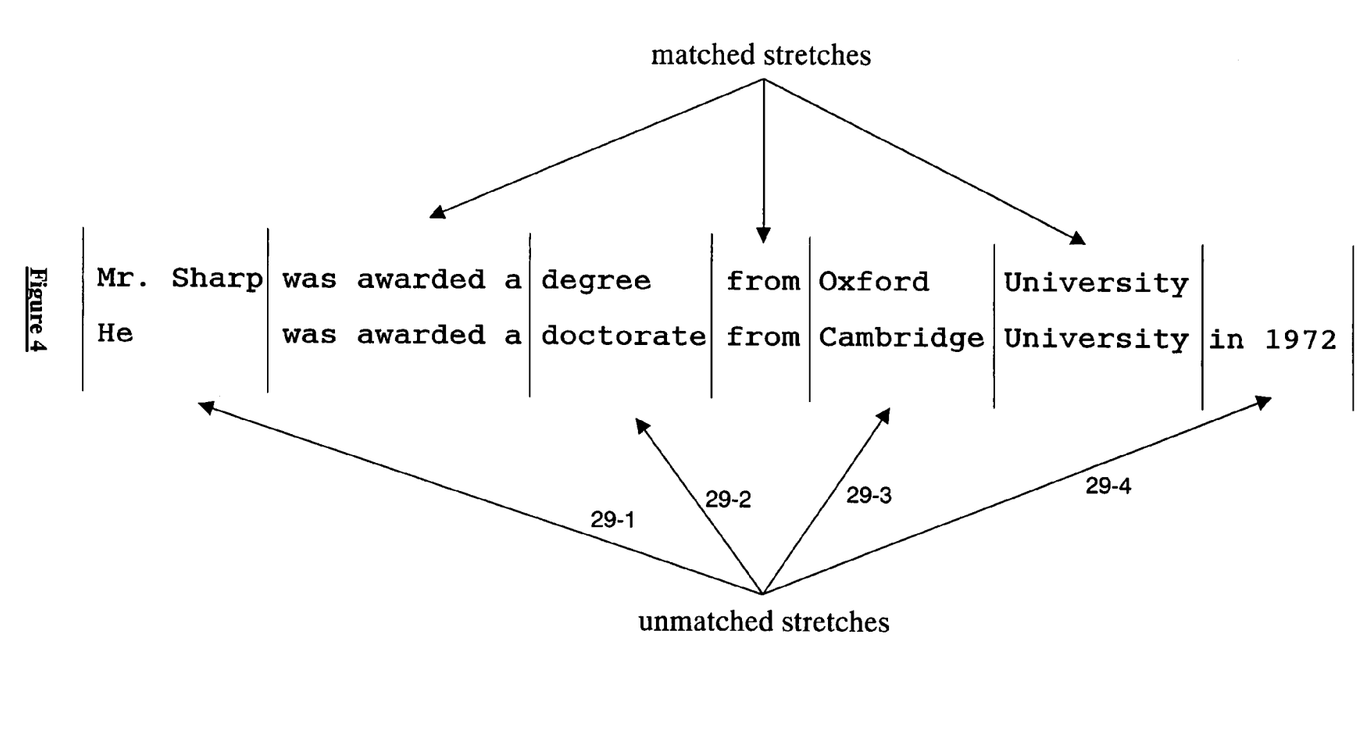
FIG. 4 illustrates an example of a correspondence determined between input and base example sentences in an embodiment of the present invention.

An example correspondence is shown in FIG. 4, where the input sentence is "Mr. Sharp was awarded a degree from Oxford University" and the selected example sentence is "He was awarded a doctorate from Cambridge University in 1972". The matched stretches are "was awarded a", "from" and "University", with the other parts being the unmatched stretches (labelled as 29-1 to 29-4 in FIG. 4). The correspondence between unmatched stretches is shown in FIG. 4.

The sequence of alternating matched and unmatched stretches is then input to a scoring function which quantifies the similarity of the two sentences. One possible scoring function, which prefers long matched stretches, and short unmatched stretches, is as follows:

$$\text{similarity}(Q, X) = \frac{\sqrt{\sum_{i=1}^{m} (\text{length}(q_i))^2} - \sqrt{\sum_{j=1}^{u} \left(\frac{\text{length}(q_j) + \text{length}(x_j))}{2}\right)^2}}{\text{length}(Q)},$$

where:

Q is the input sentence;

X is the example sentence;

m is the number of matched stretches in the correspondence;

$q_i$ is the $i^{th}$ matched stretch;

u is the number of unmatched stretches in the correspondence;

$q_j$ is the $j^{th}$ input unmatched stretch; and $x_j$ is the $j^{th}$ example unmatched stretch.

Such a metric may also be altered to favour various features of a correspondence. For example, a term can also be included in the above expression that provides a higher similarity score where the two sides of an unmatched stretch are of similar length. There are also several ways in which the computation of similarity can be made more sensitive to the linguistic content of the input and example sentences. A term can be included which favours unmatched stretches that are similar in syntactic structure. If query terms are lemmas, then the unmatched stretches may be compared for similarity in parts-of-speech sequence. If a thesaurus is available, a measure of semantic similarity or proximity may also be included.

If no sufficiently similar example can be found, for example where the similarity score does not exceed a certain threshold for any of the example sentences, the system may return no answer. In an interactive context (as typical for use of Translation Memory system), or in a multi-engine context where another translation module may provide a translation, this is an acceptable response. Alternatively, the system may apply various operations to split the input into parts that can be translated independently. For example, a slight variant of the similarity expression above, in which the first and final unmatched stretches are excluded (the "ends-free" variant), allows the detection of locally similar examples which can be translated independently and combined using EBMT techniques.

The highest scoring example sentence is selected and, as mentioned above, its paired target language translation is used as a translation basis for translation planning and translation performed respectively by the translation planner portion 11 and the translator portion 13, as will now be described with reference to steps S3 to S9 of FIG. 2.

In step S3, the translation planner portion 11 identifies a portion of the input sentence that differs from a corresponding portion of the base example sentence, these portions being referred to as input and base example unmatched stretches respectively. In this embodiment, the task of identifying unmatched stretches for the input and base example will already have been performed by the corresponder portion 9 as described above, and so this task need not be repeated by the translation planner portion 11. Therefore, in step S3 the translation planner portion 11 identifies an input unmatched stretch and corresponding base example unmatched stretch based on the previous analysis of the corresponder portion 9. If more than one unmatched stretches has been previously identified by the corresponder portion 9, a single such unmatched stretch is selected for the present iteration, moving on to further unmatched stretches in later iterations.

In step S4, the translation planner portion 11 locates the portion of the target language translation basis selected in step S2 which is aligned to the base example unmatched stretch. The translation planner portion 11 records in the translation plan that this portion is to be replaced by the translation of the input unmatched stretch. The method by which the word aligner 24 aligns words or phrases in the source language with words or phrases in the target language sentence is not important, and techniques for achieving this can readily be found in the prior art referenced above. The greater the extent to which examples are aligned at higher units than words, the more accuracy and coverage will be improved.

At this stage, the unmatched stretches are extended to include any adjacent matched segments that occur in the same alignment. For instance, if the input is 'railway strike' and the base example contains 'general strike', aligned with the single Japanese word 'genesuto' in the translation basis, the latter must be replaced by the translation of both unmatched 'railway' and matched 'strike'. Therefore, step S4 effectively operates in cooperation with step S3 to modify the input and base example unmatched stretches identified in step S3 according to the alignment analysis of step S4.

The translation planner portion 11 is also responsible for determining the action to be taken in more complex or special cases and can be configured to act on the basis of what knowledge is available, what output is appropriate in a particular usage (for example, interactive TM, multi-engine, and so on), and other parameters.

Figure 5:
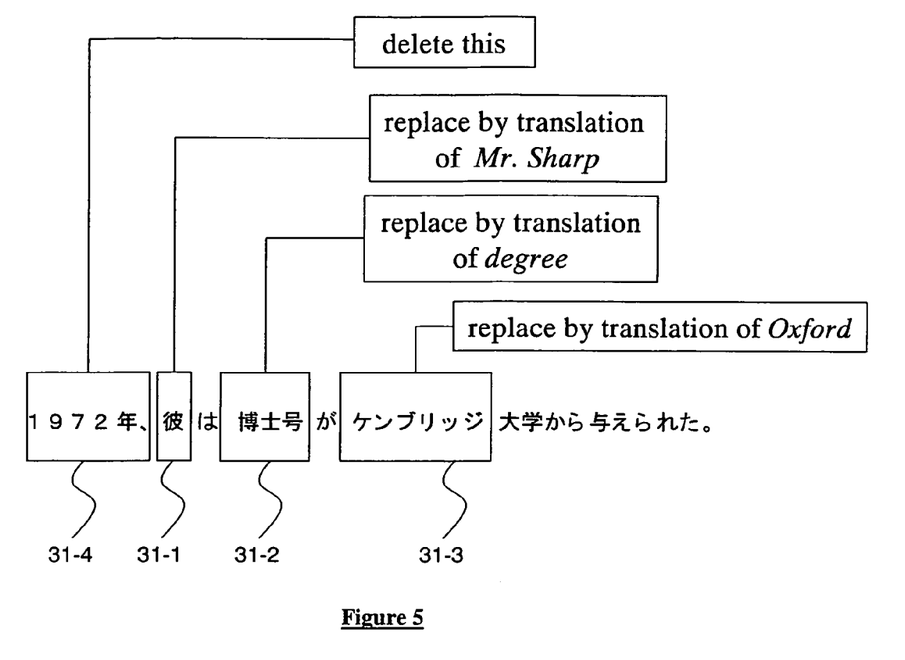
FIG. 5 illustrates a translation plan for the example shown in FIG. 4.

As described below with reference to step S8, steps S3 and S4 are repeated for each unmatched stretch, and this results in a complete translation plan setting out how all portions in the translation basis that are aligned with input unmatched stretches are dealt with to produce the final translation. Such a complete translation plan is illustrated in FIG. 5, which is based on the example explained above with reference to FIG. 4. Shown in FIG. 5 are the four portions 31-1 to 31-4 of the translation basis that correspond to the four unmatched stretches 29-1 to 29-4 respectively of the input and base example sentences. The translation plan created by the translation planner portion 13 indicates that: portion 31-1 of the translation basis ("彼" which corresponds to "he" from the base example unmatched stretch 29-1) is to be replaced by the translation of "Mr Sharp" from the corresponding input unmatched stretch 29-1; portion 31-2 of the translation basis ("博士号", which corresponds to "doctorate" from the base example unmatched stretch 29-2) is to be replaced by the translation of "degree" from the corresponding input unmatched stretch 29-2; portion 31-3 of the translation basis ("ケンブリッジ" which corresponds to "Cambridge" from the base example unmatched stretch 29-3) is to be replaced by the translation of "Oxford" from the corresponding input unmatched stretch 29-3; and portion 31-4 of the translation basis ("１９７２年", which corresponds to "in 1972" from the base example unmatched stretch 29-4) is to be deleted since the corresponding input unmatched stretch 29-4 is empty.

Although steps S3 and S4 can be repeated for each unmatched stretch to create an overall translation plan as exemplified by Figure before moving on to translation by the translator portion 13, in the present embodiment a "partial" translation plan relating to a single unmatched stretch is drawn up in steps S3 and S4 for each iteration, which is then passed immediately to the translator portion 13 for processing in steps S5 to S7 (to be described below). FIG. 5 therefore shows four such "partial" translation plans.

For a particular partial translation plan passed to the translator portion 13, a translation is first sought for the whole input unmatched stretch and if one cannot be found then the stretch is partitioned into subsets and translations sought for these independently and in turn. For convenience, the subset of the input unmatched stretch currently being translated is referred to herein as the 'focus stretch', containing one or more 'focus terms'. The 'focus stretch' could be the whole input unmatched stretch.

In step S5, the translator portion 13 uses the input focus stretch to select a set of "subsidiary example" sentences from the store 17. A subsidiary example is an example sentence in the store 17 that contains one or more of the focus terms. Example sentences from the store 17 containing the focus terms will already have been determined during the initial retrieval phase described above in relation to step S2 and reflected in the powerset data structure as explained with reference to FIG. 3, and this is explained further below with reference to step T1 of FIG. 6.

In step S6, a choice of possible translations T corresponding to the input focus stretch is determined from the set of subsidiary example sentences, for example from the correspondence between the focus stretch and a subsidiary example and the alignment between the subsidiary example and its associated target language translation. In step S7, a translation is selected from the choice of translations T based on a predetermined selection algorithm (to be described below) and the selected translation is used in step S9 to replace the portion located in step S4.

Figure 6:
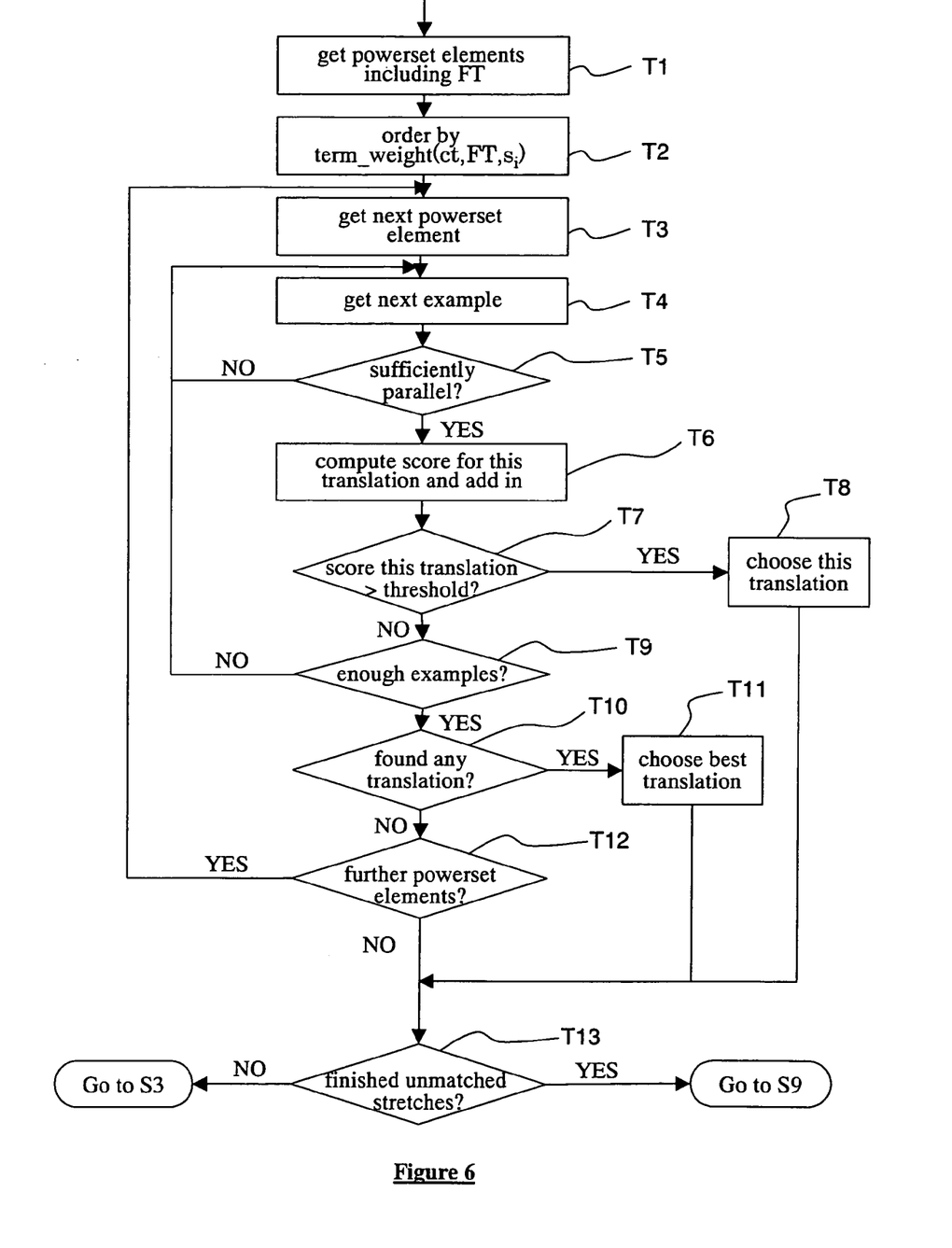
FIG. 6 is a flowchart illustrating in more detail the steps performed in an embodiment of the present invention to determine suitable translations of the input unmatched stretches.

Further details of steps S5 to S7 will now be provided with reference to flowchart of FIG. 6.

Step T1 of FIG. 6 corresponds to step S5, and comprises retrieving the powerset elements including the focus terms FT in the focus stretch. For instance, referring to the example shown in FIG. 3, if the focus stretch comprises the single focus term "electronics", then the subset 27 of powerset elements 23-1, 23-5, 23-6 and 23-7 would be selected, such that a set of subsidiary example sentences is defined in the associated postings lists 25-1, 25-5, 25-6 and 25-7. As mentioned above with reference to step S6, these subsidiary example sentences define a choice of possible translations T.

A translation T in the choice is a translation of the focus terms in the input sentence, determined from the correspondence between the focus stretch and the subsidiary example, together with the alignment between the subsidiary example and its associated target language translation. For example, a focus term "atmosphere" may result in some subsidiary examples containing the word "atmosphere" in the sense of what surrounds the earth, and some others containing that word in the sense of a mood or feeling; these two senses will likely be associated with different translations, resulting in a choice of translations T for the focus term "atmosphere". The translations in the choice can be referred to as "subsidiary translations".

The predetermined selection algorithm mentioned above with reference to step S7 will now be explained. An overall explanation of the algorithm will first be presented, followed by a more detailed explanation of how the algorithm is implemented in this embodiment with reference to the steps shown in FIG. 6.

Some of the subsidiary example sentences may contain other terms from the query which do appear in the best example and have translations in the basis. The appearance of index terms in common between the input sentence and the subsidiary example sentence provides further evidence that the translation associated with that subsidiary example sentence is correct, even when those index terms in the input sentence are not themselves to be translated. Such index terms may even be quite remote in the input sentence from the focus stretch being translated.

The weight to be given to such evidence depends on a combination of how common the index term is and how near it is in the sentence to the material to be translated in the focus stretch. For instance, in attempting to translate the word 'speech' (having alternate senses as a public activity or a linguistic phenomenon) the common word 'make' is a good indicator of the public activity sense only in very close proximity, while a rarer word such as 'phonetic' is a much better indication of the other sense even when much further away. But any particular piece of evidence can be misleading (consider 'his speech mentioned phonetics'). For the highest accuracy, multiple sources of evidence should be combined.

In the present embodiment, for a particular focus stretch having focus terms FT, a combination of evidence for a particular translation T for those focus terms FT is achieved by assigning a weight to each of one or more subsidiary examples featuring that translation T in its target language side, and summing these weights:

$$\text{goodness}(T, FT, Si) = \sum_{Se \in S(T)} \text{weight}(s_e, s_i, FT),$$

where:
goodness(T, FT, $s_i$) is a measure of the goodness of a translation T for focus terms FT in input string $s_i$;
S(T) is a subset of examples with translation T in its target language side; and
weight($s_e$, $s_i$, FT) is the weight given to example se and input $s_i$ with regard to the focus terms FT.

The weights themselves are a function of the distribution of context terms with respect to the focus terms in both the input sentence and the source language side of the example:

$$\text{weight}(s_e, s_i, FT) = \prod_{ct \in C(s_e, s_i)} \text{term\_weight}(ct, FT, s_e) \times \text{term\_weight}((ct, FT, s_i)),$$

where:
$C(s_e, s_i)$ is the set of context terms shared by input and example;
term_weight(ct, FT, s) is the weight contributed by context term 'ct' in string s with respect to FT, as follows:

$$\text{term\_weight}(ct, FT, s) = d(ct, FT, s)^{1/(k_1 * (\log(\text{freq}(ct)/N) + k_2))}$$

where:
term_weight(ct, FT, s) is the weight of context term 'ct' at a distance d(ct, FT, s) word positions from the nearest of the focus terms FT in string 's';
freq(ct) is the frequency of the context term 'ct' in a collection of N documents; and
$k_1$ and $k_2$ are weighting factors for fine-tuning the term-weights.

Context terms of any frequency have a weight of 2 adjacent to a focus term, but this falls off much more rapidly with distance for high frequency terms. The weight of a set of contextual terms is then the product of these weights in the input and the example Returning to the flowchart of FIG. 6, a set of powerset elements has been selected in step T1 as explained above. In the case of the input, the value of term_weight(ct, FT, $s_i$) need be computed only once for each context term 'ct' in a powerset element. Referring to the subset 27 of powerset elements shown in FIG. 3 as an example, for each powerset element the focus term FT is "electronics", with any other words in the powerset element constituting the context terms 'ct'. For example, for powerset element 23-7 the context terms 'ct' are "engineering" and "degree". Using the above formula for term_weight(ct, FT, $s_i$), the powerset elements selected in step T1 are ordered in step T2 by the weight given to their context terms, in order of decreasing weight.

These powerset elements are then selected in turn in the order assigned in step T2 and the weights of the individual examples in the postings lists to which they map are considered. In step T3, the next powerset element is selected for analysis (or the first powerset element for the first iteration), and in step T4 the next subsidiary example in its associated postings list is retrieved (or the first subsidiary example for the first iteration).

Before the expression weight($s_e$, $s_i$, FT) for each example is computed, it is first determined whether the example should be excluded from consideration, or at least have its consideration deferred. This is determined in step T5 by computing the parallelism between the configuration of focus terms in the example and the input. Unless the two are closely parallel the translation of one is unlikely to be a good translation of the other. To determine parallelism, the correspondence between the example and the smallest stretch including the focus terms is computed using the 'ends-free' formula described above. This can be subject to a reasonably high threshold, with any example falling below the threshold being discarded such that processing is returned to step T4 to retrieve the next example. If no example passes the threshold, then the focus terms will be translated in subsets, and as each such subset is considered the other terms from the input unmatched stretch are treated as context terms.

Where an example exceeds the threshold, processing continues to step T6 where the contribution of the contextual terms is then considered. An overall weight for the example is obtained using the above formulas, and this weight is added to that for the translation T for the focus terms corresponding to this example's target language side.

Processing to determine a translation for the unmatched stretch can be stopped at various points. For example, in step T7 it is determined whether the translation whose weight has just been increased has reached or exceeded a certain threshold. If so, then that translation is chosen in step T8 and processing passes to step T13. If not, then processing continues to step T9.

In T9 it is determined whether the number of examples considered has reached a certain threshold. If not, then processing returns to step T4 to process the next example. If so, then it is determined in step T10 whether a translation has yet been found. If so, then the best translation is chosen in step T11 according to which has the highest weight and processing passes to step T13; and if not then processing passes to step T12.

Since evidence of two or more terms being translated together is usually favoured, if any translation for a given focus set is found, processing is usually stopped after considering this without proceeding to smaller subsets of focus terms. However, if there is no translation for a larger focus set, smaller subsets should be considered, and here the contribution of the contextual terms becomes more important. As mentioned above, a focus term in one iteration may become a context term in a later iteration if there is insufficient parallelism between query and example.

In step T12 it is determined whether there are any further powerset elements to process. If so, then processing returns to step T3 to select the next powerset element, and if not then processing continues to step T13. (If there are further focus stretches within the unmatched stretch to be processed, then steps T1 to T12 are repeated for those further focus stretches before step T13 is performed.) Step T13 corresponds to step S8 of FIG. 2, in which it is determined whether all unmatched stretches have been considered. If not, then processing returns to step S3 of FIG. 2 ready for the next unmatched stretch. If so, then translation of the focus stretch is complete.

For each unmatched stretch, the translation selected in step S7 for that unmatched stretch is used to replace the portion located in step S4, resulting in a complete output target language sentence in step S10 which is provided at the output portion 15. If there are any unmatched stretches that could not be translated completely or at all, manual intervention is required to edit the output sentence as considered appropriate. The sentence can in any case be presented for inspection an editing if necessary. After such editing, the output target language sentence can itself be added to the store 17 along with the source language input sentence for future use; this is represented by the return path 16 in FIG. 1 from the output portion 15 to the store 17.

Figure 7:
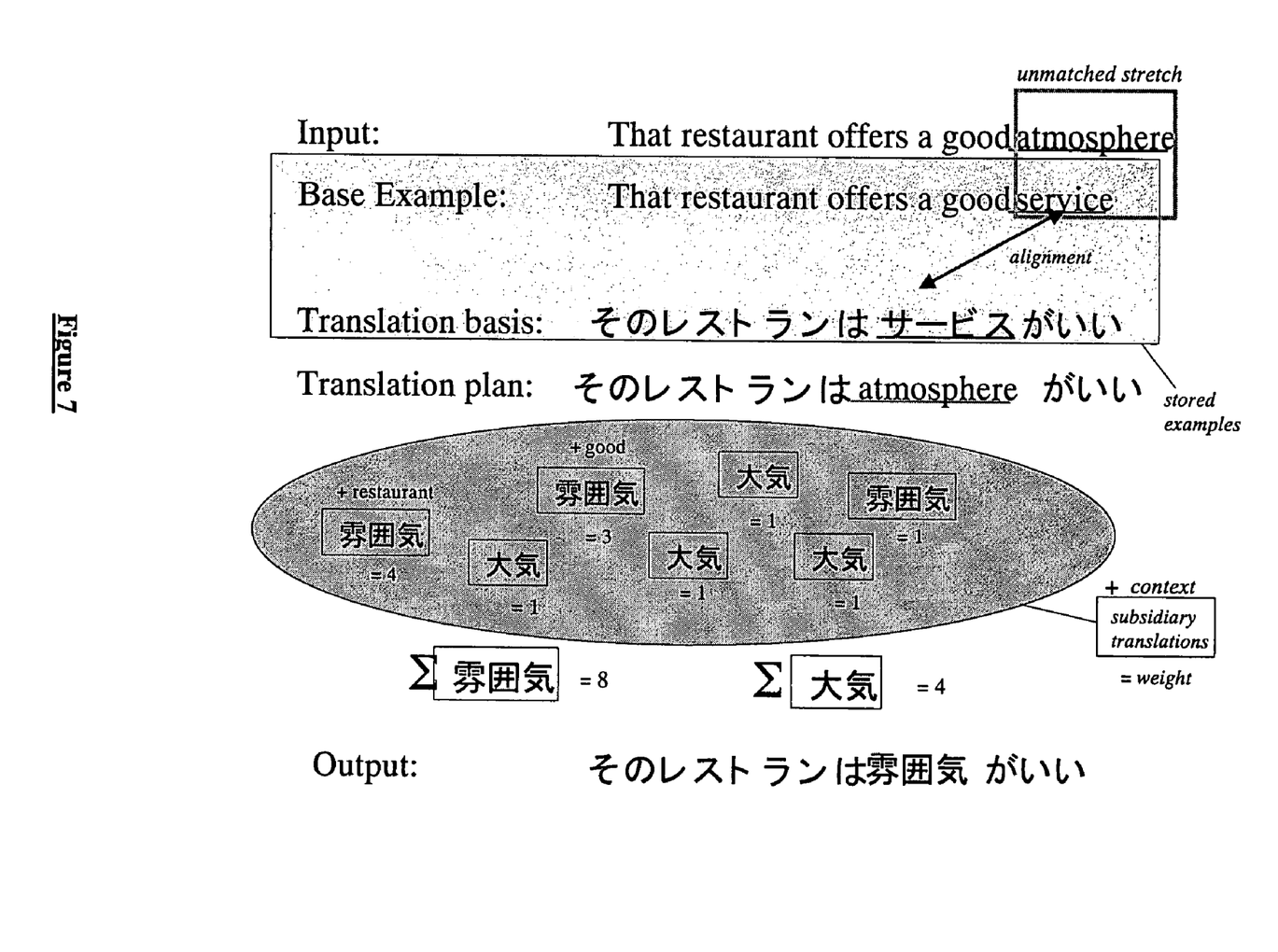
FIG. 7 illustrates another example of the operation of an embodiment of the present invention.

FIG. 7 illustrates an example in which the translation system 1 embodying the present invention has been used to find a translation for the input sentence "That restaurant offers a good atmosphere". A base example sentence "That restaurant offers a good service" is chosen in step S2, with its paired translation "そのレストランはサービスがいい" being used as the translation basis. A single input unmatched stretch and corresponding base example unmatched stretch are determined in step S3 as being "atmosphere" and "service" respectively. In step S4 the aligned portion "サービス" is located in the translation basis as corresponding to the base example unmatched stretch "service", and this aligned portion is marked in the translation plan as being for replacement by a suitable translation of "atmosphere" from the input unmatched stretch. A choice of translations (subsidiary translations) of "atmosphere" is determined as comprising "雰囲気" and "大気" in steps S5 and S6. In step S7, preference values are assigned to these subsidiary translations according to the above-described algorithm, with the translation "雰囲気" being selected as having the highest preference value. In step S9, the selected translation "雰囲気" is used to replace the aligned portion "サービス" of the translation basis located in step S4, resulting in the output target language sentence "そのレストランは雰囲気がいい".

Various modifications can be made to the above-described embodiment. For example, the formula for term_weight can be fine-tuned with the parameters $k_1$ and $k_2$ and optimised on a training set. The translation system can also include a simple parser, where the formula for term_weight is modified by replacing distance in terms of word positions by a measure of distance in a dependency graph. The formula for term_weight can also be modified by replacing the raw normalised frequency of the context term with a measure of cooccurence of the context term and one or more focus terms. The weight of a subsidiary example could also depend on whether a context term is translated in the same way in the base example and the subsidiary example, where the appearance of a different translation in the two cases indicates that this subsidiary example should be weighted lower.

Although it is described above that a single base example is selected in step S2 that gives the highest similarity score, it is of course possible that more than one base example is chosen for further analysis, for example those giving the highest similarity scores. In such a situation, each such chosen base example would be subject to the same translation process described with reference to steps S3 to S9, and either the output sentence giving the best translation would be chosen for use as the output target language sentence in step S10, or the user of the translation system 1 could be presented with a choice of translations which could be ranked in order for selection and/or further editing.

An embodiment of the present invention improves on the prior art Translation Memory systems (for example, WO 99/57651) by allowing retrieved example sentences to differ from input sentences in a greater variety of ways. The categories of names and numbers are extended to arbitrary constituents whose translation may be contextually determined, and the determined translations are substituted at the correct point in the overall translation. This increases the range of inputs for which a TM is applicable and reduces the amount of manual intervention required to convert the translation basis into a correct translation of the input. Both of these factors improve the utility of the TM to the translator.

It will be apparent that the translation process is structured differently in the above embodiment and prior art Example-Based MT systems. Nevertheless, it will also be apparent that various aspects of the present invention may be adapted for use in an Example-Based MT system with beneficial effects. For instance, the use of a discontinuous correspondence as a framework for integrating subsidiary translations would be beneficial as a way of avoiding dependence on a full syntactic analysis of the input and examples and syntax-based alignment of the source and target sides of an example pair. Furthermore, the combination of frequency and contextual similarity for determination of the best translation may be applied with beneficial effect to the translation of any fragment within the operation of an EBMT system.

The notion of a correspondence in an embodiment of the present invention allows a single best example to act as a syntactic template. This limits the recall to some extent but maintains high accuracy. The translations of unmatched stretches are substituted at the appropriate points within this template. Even when translating between languages with different word orders, such as English and Japanese, a complete syntactic analysis of examples is rendered unnecessary. However, a syntactic analysis of unmatched stretches extends the applicability of the technique while maintaining accuracy.

An embodiment of the present invention also provides a solution to the problem of choosing a best translation of each fragment by combining information about the frequency of particular translations with evidence determining the contextual appropriateness of each translation. None of the prior art addresses the combination of information about the frequency of particular translations for a given source language phrase with information about the similarity of the input and the example in which it occurs in order to obtain a measure of goodness of translation.

It will be appreciated that a translation system embodying the present invention can be implemented in hardware or software, or a combination of both. For example, an embodiment of the present invention could be carried out under control of a computer program. Such a program can be stored on a computer-readable medium. The appended claims are to be interpreted as covering a computer program by itself, or as record on a carrier, or in any other form.

Although the embodiment described above concerned a translation apparatus in which the input is a sequence of words (sentence) in a first (source) language and the output is a sequence of words (sentence) in a second (target) language, it will be appreciated that the invention has broader application and is not limited to the translation between spoken languages. The input can be a sequence of data items in a first format and the output can be a sequence of data items in a second format, where the data items can be any type of data.

It will also be appreciated that the store of examples used in determining base example could be different from that used for determining the subsidiary example. For example, the former could be part of a separate, conventional, TM system for providing the base example for use by the translation planner portion 11 and the translator portion 13 as described above.

What is claimed is:

1. A method performed in a Translation Memory Apparatus for translating an input sequence of data items in a first format to an output sequence of data items in a second format using a store comprising a plurality of example sequences in the first format each paired with its translation in the second format, comprising:
    (a) a processor of the apparatus choosing a base example sequence from the store based on a comparison of the input sequence with each of a plurality of example sequences from the store, and using its paired translation as a translation basis;
    (b) the processor identifying a portion of the input sequence differing from a corresponding portion of the base example sequence, these portions being designated input and base example unmatched portions respectively and other portions that are not the unmatched portions being designated input and base example matched portions respectively;
    (c) the processor locating a portion of the translation basis corresponding to the base example unmatched portion, wherein, when the portion of the translation basis corresponds to the base example unmatched portion and an adjacent base example matched portion, extending the base example unmatched portion to include the adjacent base example matched portion, and extending the corresponding input unmatched portion to include an adjacent input matched portion corresponding to the adjacent base example matched portion;
    (d) the processor using the input unmatched portion to select a set of subsidiary example sequences from the store;
    (e) the processor determining from the set of subsidiary example sequences a choice of possible translations corresponding to the input unmatched portion;
    (f) the processor selecting a translation from the choice based on a predetermined selection algorithm and using the selected translation to replace the portion located in step (c); and
    (g) the processor using the result of step (f) as a basis for the output sequence of data items.

2. The method as claimed in claim 1, wherein steps (b) to (f) are repeated for a plurality of input unmatched portions identified in the input sequence.

3. The method as claimed in claim 2, wherein steps (b) to (t) are repeated for every unmatched portion identified in the input sequence.

4. The method as claimed in claim 1, wherein the base example sequence chosen in step (a) is the example sequence from the store which most closely matches the input sequence according to a predetermined measure of closeness.

5. The method as claimed in claim 1, wherein a base example unmatched portion identified in step (b), and its corresponding translation basis portion located in step (c), may be an empty sequence positioned between two adjacent data items, such that the replacement in step (f) is effectively an insertion at a position.

6. The method as claimed in claim 1, wherein in step (f) a morphological variant of the selected translation is used to replace the portion located in step (c) depending on context.

7. The method as claimed in claim 1, wherein further processing is performed on the sequence resulting from step (f) before use as the output sequence of data items.

8. The method as claimed in claim 1, wherein the data items are words.

9. The method as claimed in claim 8, wherein the first and second formats are first and second languages respectively.

10. The method as claimed in claim 9, wherein the input sequence of data items forms a grammatically complete phrase.

11. The method as claimed in claim 10, wherein the input sequence of data items forms a sentence.

12. The method as claimed in claim 1, wherein in step (c) the portion is located using an alignment between parts of the base example sequence and respective parts of its paired translation.

13. The method as claimed in claim 12, wherein the alignment is predetermined.

14. The method as claimed in claim 1, wherein step (d) comprises the processor selecting an example sequence for inclusion in the set if at least one data item in the example sequence matches or corresponds to at least one data item in the input unmatched portion.

15. The method as claimed in claim I, wherein step (e) comprises the processor identifying, for a subsidiary example in the set, a portion of the subsidiary example corresponding to the input unmatched portion, and using a corresponding portion of the translation paired to the subsidiary example to form one of the possible translations in the choice.

16. The method as claimed in claim 1, wherein the predetermined selection algorithm comprises the processor, for each of at least one translation in the choice, allocating to the translation a preference value determined in dependence upon at least one subsidiary example from which the translation is derived.

17. The method as claimed in claim 16, wherein a preference value is determined in dependence upon a comparison between the input sequence and each of the at least one subsidiary example.

18. The method as claimed in claim 17, wherein a preference value is determined by allocating a weighting to the or each such comparison, and combining the allocated weighting(s) in a predetermined manner.

19. The method as claimed in claim 18, wherein a weighting is allocated in dependence upon the number of data items or variants thereof common to the input sequence and the subsidiary example in the comparison.

20. The method as claimed in claim 18, wherein a weighting is allocated in dependence upon one or more of the following properties of a data item common to the input sequence and the subsidiary example: the position in sequence of the common data item; the frequency of the common data item in a predetermined corpus; the concurrence frequency of the common data item with the input unmatched portion; and the deviation of the concurrence frequency from that predicted by the frequency of the common data item and the input unmatched portion.

21. The method as claimed in claim 20, wherein a weighting is allocated in dependence upon the position in sequence of the common data item relative to the unmatched portion.

22. The method as claimed in claim 18, wherein the allocated weightings are combined by summation.

23. The method as claimed in claim 17, wherein the data item(s) in the input unmatched portion is not included in the comparison.

24. The method as claimed in claim 16, wherein a preference value is determined in dependence upon a comparison between the translation basis and the translation paired to each of the at least one subsidiary example.

25. The method as claimed in claim 16, wherein the predetermined selection algorithm further comprises the processor selecting a translation from the choice in dependence upon allocated preference value(s).

26. The method as claimed in claim 16, wherein a preference value is allocated to the or each translation in the choice.

27. The method as claimed in claim 16, wherein the preference value is determined in dependence upon the or each subsidiary example from which the translation is derived.

28. The method as claimed in claim 1, wherein the predetermined selection algorithm allows manual intervention to influence the translation selected.

29. The method as claimed in claim 1, comprising, where a suitable translation cannot be selected in step (f), the processor subdividing the input unmatched portion into a plurality of input unmatched portions and identifying corresponding respective base example unmatched portions, and performing steps (c) to (f) for each unmatched portion.

30. The method as claimed in claim 1, comprising, where a suitable base example cannot be found in step (a), the processor subdividing the input sequence into a plurality of input sub-sequences, performing steps (a) to (f) for each such sub-sequence, and combining the results from the steps (f) to produce the output sequence in step (g).

31. The method as claimed in claim 1, wherein the store comprises separate stores for use respectively in steps (a) and (d).

32. A Translation Memory system comprising apparatus for translating an input sequence of data items in a first format to an output sequence of data items in a second format using a store comprising a plurality of example sequences in the first format each paired with its translation in the second format, the apparatus comprising:

a unit which chooses a base example sequence from the store based on a comparison of the input sequence with each of a plurality of example sequences from the store, and uses its paired translation as a translation basis;

a unit which identifies a portion of the input sequence differing from a corresponding portion of the base example sequence, these portions being designated input and base example unmatched portions respectively and other portions that are not the unmatched portions being designated input and base example matched portions respectively;

a unit which locates a portion of the translation basis corresponding to the base example unmatched portion, wherein, when the portion of the translation basis corresponds to the base example unmatched portion and an adjacent base example matched portion, extending the one of the base example unmatched portion to include the adjacent base example matched portion, and extending the corresponding input unmatched portion to include an adjacent input matched portion corresponding to the adjacent base example matched portion;

a unit which uses the input unmatched portion to select a set of subsidiary example sequences from the store;

a unit which determines from the set of subsidiary example sequences a choice of possible translations corresponding to the input unmatched portion;

a unit which selects a translation from the choice based on a predetermined selection algorithm and uses the selected translation to replace the portion located by the locating unit; and a unit which uses the result of the selecting unit as a basis for the output sequence of data items.

33. A computer readable recording medium having stored thereon a computer executable program for translating an input sequence of data items in a first format to an output sequence of data items in a second format using a store comprising a plurality of example sequences in the first format each paired with its translation in the second format, comprising:
  (a) choosing a base example sequence from the store based on a comparison of the input sequence with each of a plurality of example sequences from the store, and using its paired translation as a translation basis;
  (b) identifying a portion of the input sequence differing from a corresponding portion of the base example sequence, these portions being designated input and base example unmatched portions respectively and other portions that are not the unmatched portions being designated input and base example matched portions respectively;
  (c) locating a portion of the translation basis corresponding to the base example unmatched portion, wherein, when the portion of the translation basis corresponds to the base example unmatched portion and an adjacent base example matched portion, extending the base example unmatched portion to include the adjacent base example matched portion, and extending the corresponding input unmatched portion to include an adjacent input matched portion corresponding to the adjacent base example matched portion;
  (d) using the input unmatched portion to select a set of subsidiary example sequences from the store;
  (e) determining from the set of subsidiary example sequences a choice of possible translations corresponding to the input unmatched portion;
  (f) selecting a translation from the choice based on a predetermined selection algorithm and using the selected translation to replace the portion located in step (c); and
  (g) using the result of step (f) as a basis for the output sequence of data items.

* * * * *